United States Patent [19]

Iwane

[11] Patent Number: 5,860,032

[45] Date of Patent: Jan. 12, 1999

[54] AUTOFOCUS DEVICE OF A CAMERA AND METHOD

[75] Inventor: Toru Iwane, Yokohama, Japan

[73] Assignee: Nikon Corporation, Tokyo, Japan

[21] Appl. No.: 881,490

[22] Filed: Jun. 24, 1997

Related U.S. Application Data

[63] Continuation of Ser. No. 496,664, Jun. 29, 1995, abandoned.

[30] Foreign Application Priority Data

Sep. 7, 1994 [JP] Japan .................................. 6-213401

[51] Int. Cl.⁶ .......................... G03B 13/34; G03B 15/16; G03B 3/10; G03B 39/00
[52] U.S. Cl. ............................................. 396/95; 396/125
[58] Field of Search .................................. 354/400–408; 396/95, 125, 104; 348/352; 352/140

[56] References Cited

U.S. PATENT DOCUMENTS

| | | | |
|---|---|---|---|
| 4,167,316 | 9/1979 | Johnson et al. | 354/197 |
| 4,908,645 | 3/1990 | Higashihara et al. | 354/402 |
| 4,988,856 | 1/1991 | Hamada et al. | 250/201.8 |
| 5,060,002 | 10/1991 | Ohnuki et al. | 354/402 |
| 5,061,951 | 10/1991 | Higashihara et al. | 354/400 |
| 5,138,356 | 8/1992 | Nakamura et al. | 354/402 |
| 5,179,407 | 1/1993 | Kusaka et al. | 354/400 |
| 5,189,459 | 2/1993 | Watanabe et al. | 354/402 |
| 5,276,476 | 1/1994 | Uenaka | 354/400 |
| 5,291,235 | 3/1994 | Uenaka | 354/402 |
| 5,327,190 | 7/1994 | Nakamura et al. | 354/402 |
| 5,392,088 | 2/1995 | Abe et al. | 354/402 |
| 5,430,287 | 7/1995 | Kusaka | 250/201.5 |
| 5,457,513 | 10/1995 | Uenaka | 354/400 |
| 5,502,537 | 3/1996 | Utagawa | 354/402 |
| 5,517,275 | 5/1996 | Kusaka et al. | 354/402 |
| 5,664,236 | 9/1997 | Utagawa | 396/96 |
| 5,732,292 | 3/1998 | Yaji | 396/128 |

FOREIGN PATENT DOCUMENTS

| | | |
|---|---|---|
| 63-14218 | 1/1988 | Japan . |
| 1-285908 | 11/1989 | Japan . |

*Primary Examiner*—Russell Adams
*Assistant Examiner*—Christopher E. Mahoney
*Attorney, Agent, or Firm*—Oliff & Berridge, PLC

[57] ABSTRACT

An autofocus device and method for a camera that can process statistically the tracking and focusing of an object in high velocity motion. The device and method corrects the acceleration of the motion and computes a lens forwarding amount and an absolute position of the object. This is achieved by a camera system including a camera body and a focus lens. The camera body includes an autofocus detector, an autofocus processor section and a main CPU. The focus lens includes a lens, a lens driving gear, a lens CPU, and a motor. This structure, having an improved autofocus processor, enables highly accurate prediction tracking and autofocus control that accommodates fluctuations in an autofocus operation.

23 Claims, 7 Drawing Sheets

AUTOFOCUS DEVICE OF A CAMERA AND METHOD

This is a continuation of application Ser. No. 08/496,664 filed Jun. 29, 1995 now abandoned.

BACKGROUND OF THE INVENTION

1. Field of the Invention

The invention relates to an autofocus device of a camera and method that enables highly accurate prediction tracking of objects moving with a high velocity, which have been difficult to focus until now. Moreover, focus precision is constantly obtained even when unstable motion due to the effects of fluctuation in autofocus detection of acceleration values are present.

2. Description of Related Art

There is a movement in the industry to make some acceleration corrections in addition to linearly predicting the change in position of the object image composition plane with the lens focused on infinite distance (hereafter "image plane position") for a moving object, especially for an object moving with a high velocity for which the time required for autofocus in a camera becomes critical. It is well known that, even when an object is in uniform motion, the behavior of the image plane cannot be expressed linearly corresponding to the motion. If, by chance, the motion of the image plane is guaranteed to be a linear motion like the motion of the object, a linear prediction method such as extrapolation of the past defocus amount data clearly results in sufficient accuracy.

Suppose an object is approaching the camera with a constant speed V and passing the vicinity of the camera at a distance h. The image plane position of the object is expressed in formula 1 below where f denotes the focal distance of the shooting lens.

$$y = \frac{f^2}{\sqrt{v^2t^2 + h^2} - f} \quad (1)$$

A graph of the formula plotted with the image plane versus time is a curve with a peak as illustrated in FIG. 1. The curve illustrated is an example of motion of an object moving with a speed of 80 km/h in which the closest point to the camera with focal length 400 mm is 10 m. The height of the peak and the condition of change of the slope depend on the focal distance of the lens, the velocity of the object, and the closest point of the object to the camera.

The simplest example of tracking motion or predicted driving is a method in which the image plane velocity is evaluated and extended; in other words, a method in which the future position of the object is predicted by extending a tangent line at a certain position to the function describing the image plane position. Of course, this method of predicted driving is well known (for example, Japanese Unexamined Laid-Open Patent Publication No. 63-14218) and is widely used today. In this method, at least the lens is simply driven to the measured position without tracking. Compared to focusing motion methods in the past, this method has produced fairly good results for focusing on a moving body.

However, speaking from the point of view of predicting target position more precisely, the tracking of such a method is nothing more than approximating locally using a linear equation or line segments. It is intuitively clear from the characteristics of the curve that this method contains a certain amount of error existing between the positions of the predicted image plane and the actual image plane. An approximation function replacing the linear equation is needed since better tracking is induced by better fitting of the curve to the tracking curve.

If the tracking prediction by a simple linear approximation is not sufficient, then a different course of action must be taken. One answer to this problem is to evaluate the acceleration component of the image plane, or, in other words, an idea in which the velocity change is predicted linearly by studying the second derivative coefficients of the curve to obtain a closer approximation.

One example of this idea is disclosed in Japanese Patent Publication No. 1-285908. In this example, a quadratic equation is determined from three image plane positions, the current position, the position one moment before, and the position two moments before, and the respective times of the three positions.

$$y = at^2 + bt + c \quad (2)$$

A target position is predicted by substituting the future time t, for the time variable t in this function. Without much effort, one can clearly see that this method predicts the target image plane position by evaluating the image plane acceleration and by extending the velocity linearly into the future. This is because evaluation of the velocity as a linear function causes the function used to describe the image plane position to become a quadratic function.

However, the above-described conventional autofocus adjustment device has the following problems.

The first problem is caused by the use of a quadratic function. It is true that use of a quadratic function improves prediction accuracy over the linear prediction method, but because the image plane position is a reciprocal type function, described by formula 1, approximation by a parabola could not have a more significant probability than the approximation of the image plane position function by a curve instead of a line. In other words, because an image plane position function is a reciprocal type function, the velocity and the acceleration of the image plane become higher order reciprocal type functions, which is characteristic of a reciprocal type function; hence, a simple linear approximation of the functions obtained by differentiating the original function does not agree with the actual conditions. Even if efforts are made to interpret in line with the actual function, since f in the denominator of formula 1 is small enough to be neglected compared to the other terms, the image plane velocity and the acceleration can be obtained as follows. By making the value of h small, these functions become reciprocal functions of a higher order as the order of differentiation becomes higher from the velocity to the acceleration.

$$\frac{dy}{dt} = \frac{-f^2 v^2 t}{(v^2 t^2 + h^2)^{3/2}} \quad (3)$$

$$\frac{d^2 y}{dt^2} = \frac{f^2 v^2 (2v^2 t^2 - h^2)}{(v^2 t^2 + h^2)^{5/2}} \quad (4)$$

To express the characteristics described above practically, the curvature increases as the curve gets closer to the center. In other words, the non-linear nature of the change in the acceleration becomes more significant. Thus, it can be concluded that a method to approximate a curve with such characteristics is not a preferred method. Since a parabola assumes that there is no change in the acceleration and that change in the velocity is linear, it is difficult to use a parabola over a gradient surface of the peak where change is very rapid.

Thus, various methods of approximating motion of the image plane corresponding to the uniform motion of an object have been tried without complete success. There should be a method more conducive to the actual conditions than the simple application and linear extension of second derivative coefficients obtained by non-advanced mathematics. A better method of approximation needs to be developed, especially around the gradient surface of the peak, though the peak itself and the very small neighborhood of the peak are not as critical.

The second problem in correctly predicting the image plane movement is as follows.

The output of defocus amounts from the autofocus detection equipment contains an error, which causes significant effects on computation of the acceleration and the velocity based on the output. In the case of a system such as the autofocus of a camera, the evaluation of the velocity and the acceleration is not normally obtained continuously, but rather is obtained by taking the differences between discrete data obtained intermittently. Because these discrete data contain fluctuations, if the velocity is 0 or if there is no change in the velocity, the difference between the data naturally represents only the fluctuations. The ratio of the error to the data increases with the order of the difference, causing the level of confidence of the data thus obtained to decrease. Even if much consideration is given to acceleration in predicting the image plane position and the image plane velocity, if the results lack a level of confidence or simply magnify the fluctuations of measured values, the true purpose of the correction itself is subverted. In determining velocity and acceleration, a method must be developed in which the fluctuations accompanying measurement are eliminated as much as possible.

SUMMARY OF THE INVENTION

It is an object of the invention to enable highly accurate prediction tracking of objects moving with a high velocity, which have been difficult to focus on until now. Moreover, focus precision is constantly obtained even in a system where the acceleration factor is included due to the effects of fluctuation in autofocus detection causing unstable motion. Furthermore, even if the lens uses a driving amount monitor using an encoder capable of measuring only relative forwarding amounts, the absolute forwarding amount or distance to the object can be measured.

The above and other objects are achieved by an autofocus device of a camera wherein driving of a focus lens is executed based on a defocus amount detector that detects the difference between an image plane of a lens and a predicted image composition plane. The autofocus device comprises a memory to store a plurality of past data sets consisting of detection amount data obtained from the defocus amount detector and data equivalent to a lens forwarding amount, and an autofocus processor that computes the data sets stored in the memory. Change in the image plane position is considered as a specific function that is fitted to the image plane movement described by the data using a statistical method based on the data sets stored. Movement of the image plane is predicted by the function.

This invention also relates to an autofocus device wherein exposure is performed continuously for a moving object such that the image composition plane during a next exposure is predicted, and the focus lens is driven so that the object image coincides with the predicted image composition plane during exposure.

This invention further relates to an autofocus device of a camera wherein driving of the focus lens is executed based on data from a defocus amount detector, a specific function for a plurality of image plane velocities obtained from the data and a linear regression equation for relative values equivalent to or corresponding to a plurality of lens forwarding amounts. The position of the image plane at a specific time is predicted based on a correlation function between the specific function and the linear regression.

This invention additionally relates to an autofocus device of a camera wherein change in the position of the image plane is considered to be a specific function. A regression line is obtained using the data group stored in the memory to fit the specific function to movement of the image plane described by the data based on the regression line. Movement of the image plane is predicted using the function, allowing driving of a focus lens based on the predicted movement.

This invention also relates to an autofocus device wherein the specific function includes a term that is the square root of the image plane velocity.

This invention still further relates to an autofocus device wherein a correlation is obtained between a plurality of image plane velocities or their function transformation values and the relative values corresponding to a plurality of lens forwarding amounts, such as encoder output values, and, based on the correlation, absolute values of the lens forwarding amounts or offset amounts enabling conversion of the relative values into absolute values are computed.

This invention additionally relates to an autofocus device of a camera wherein a regression line is obtained from the stored data group and the function transformation values of the lens forwarding amount equivalent values, and, based on the forwarding amount equivalent value at a certain time, including the current time, the image plane velocity at that time or the absolute image plane position or the image plane acceleration is computed.

This invention also relates to the autofocus device wherein the image plane position and the image plane velocity after a specified time are predicted based on the image velocity and the image plane position, the image plane acceleration being computed by the autofocus processor.

BRIEF DESCRIPTION OF THE DRAWINGS

The invention will be described in detail with reference to the following drawings wherein.

DETAILED DESCRIPTION OF PREFERRED EMBODIMENTS

Figure 2:
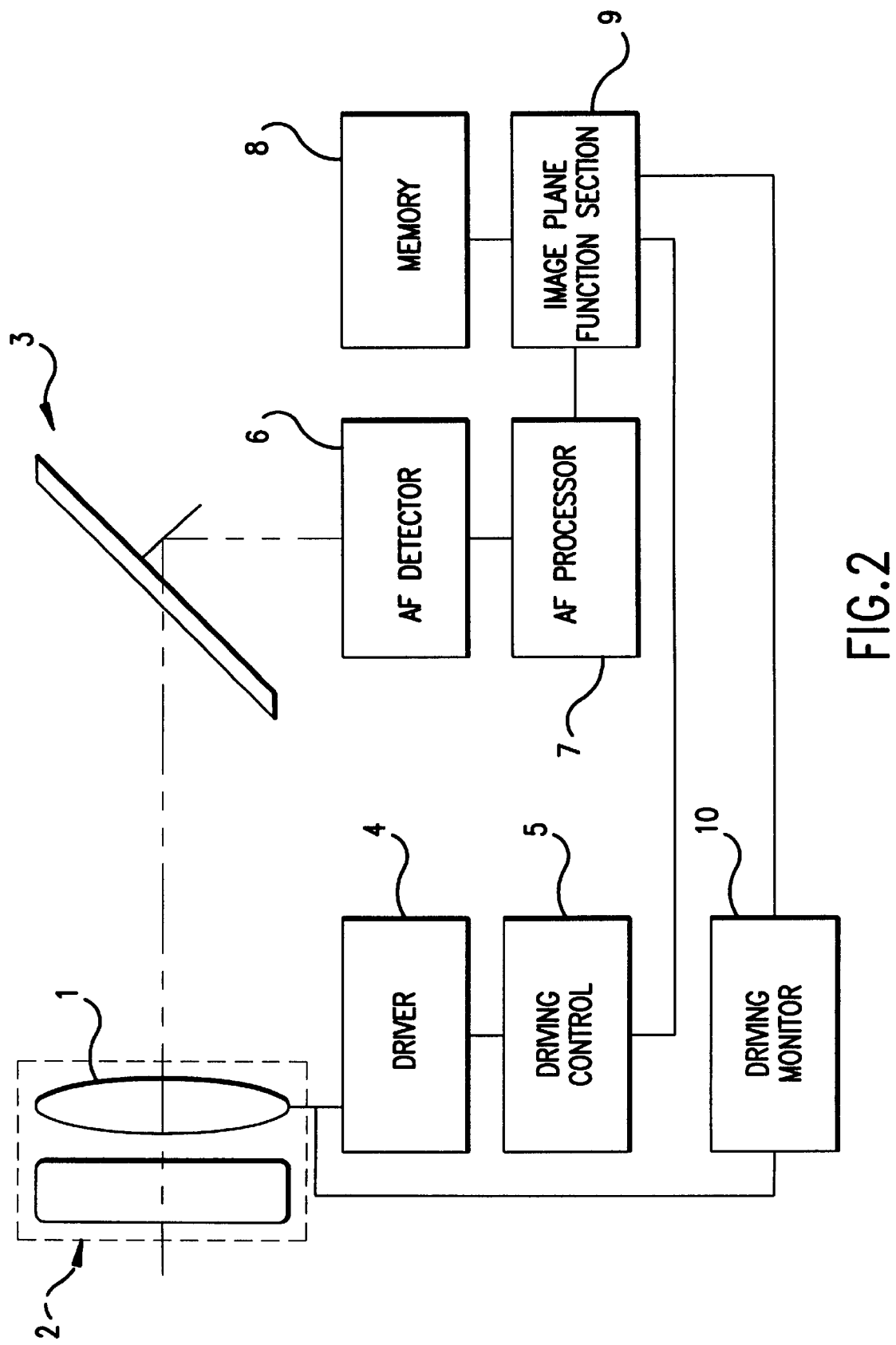
FIG. 2 shows a schematic drawing illustrating the basic structure of the first and second embodiments of the present invention.

As shown in FIG. 2, light rays containing an object image are guided through a shooting lens 2 and a focus lens 1 past one or more mirrors 3 to an autofocus detector 6. The autofocus detector 6 extracts a defocus amount from the current position of the focus lens 1 as signals, and an autofocus processor section 7 derives data as the defocus amount from the current lens position. The defocus amount data, together with lens forwarding amounts, or data corresponding to or equivalent thereto obtained from a suitable source such as a lens connection point 109 (see FIG. 3), are stored in a memory 8. The stored data are converted into a unified dimension such as an image plane movement amount and a lens forwarding amount, each of which is transformed into effective computable parameters such as image plane velocity. Paying close attention to the relationship between the past relative forwarding amount thus stored and the image plane velocity, the autofocus processor section computes statistical regression on these data and determines a regression curve for the future. This implies that the function to be fitted to the movement of the image plane is determined statistically. Using this function as a basis for tracking the prediction, the position, velocity or acceleration of the image plane after a certain time is determined using image plane function section 109, by means of which data suitable for driving focus lens 1 are computed. The focus lens 1 is driven by a driving control 5 and a driver 4 to comply with the data immediately. The autofocus device also includes a driving amount monitor 10.

Figure 3:
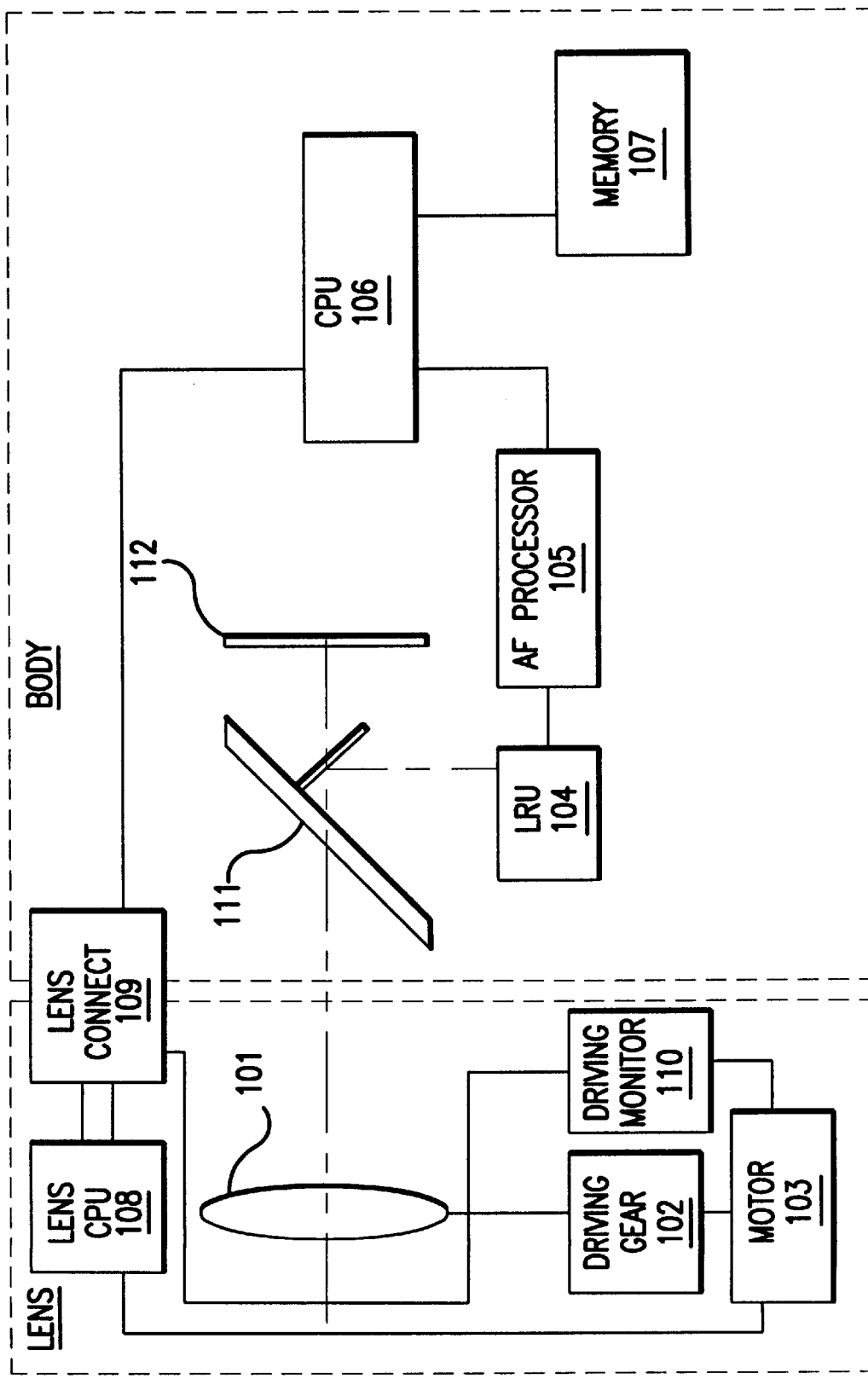
FIG. 3 shows a schematic drawing illustrating the structure of the first embodiment of the present invention.

Hereinafter, an autofocus adjustment, which is the first embodiment of the present invention, will be described. In FIG. 3, 101 is a focus lens, 102 is a driving gear used to drive the focus lens, 103 is a driving control (motor), 104 is an autofocus detector, which can be a light receiving unit (LRU), 105 is an autofocus processor section, and 106 is a main CPU.

In the illustrated embodiment, the processor sections are intended to encompass both hardware and software equivalents that achieve the same overall function. For example, the processor can be implemented as a single special purpose integrated circuit (e.g., ASIC) having a main or central processing section for overall, system-level control, and separate sections dedicated to performing various different specific computations, functions and other processes under the control of the central processor section. It will be appreciated by those skilled in the art that the processor sections can also be implemented using a plurality of separate, dedicated or programmable integrated or other electronic circuits or devices (e.g., hardwired electronic or logic circuits, or programmable logic devices such as PLDs, PLAs, PALs or the like). Such a "processor" can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 7–8 can be used. As shown, a distributed processing architecture, having a separate focus detector 104, autofocus processor section 105 and main CPU 106 is preferred.

When a moving object is captured by the autofocus detector (LRU) 104, the present embodiment operates in the following manner. When the image plane information of the object is detected by the autofocus LRU 104 and is transformed to a defocus amount by the autofocus processor section 105, the main CPU 106 stores the information in a memory 107. Moreover, the main CPU 106 obtains an output that monitors the lens forwarding amount at that time, such as the encoder output through a lens contact point 109, and stores the output. This operation is executed continuously, and a specified number of data sets are stored in the memory 107 initially. Once a specified number of data sets are stored in the memory 107, the present embodiment subsequently updates the set of data stored to always maintain the specified number of latest data sets in the memory (by discarding the oldest data whenever new data are entered).

Using several data sets thus obtained, a regression curve associated with the position of the image plane is determined by a statistical method. The position of the image plane of the object after a certain time is then computed. Here, the computation method is explained first, followed by a description of the actual operation flow.

Figure 1:
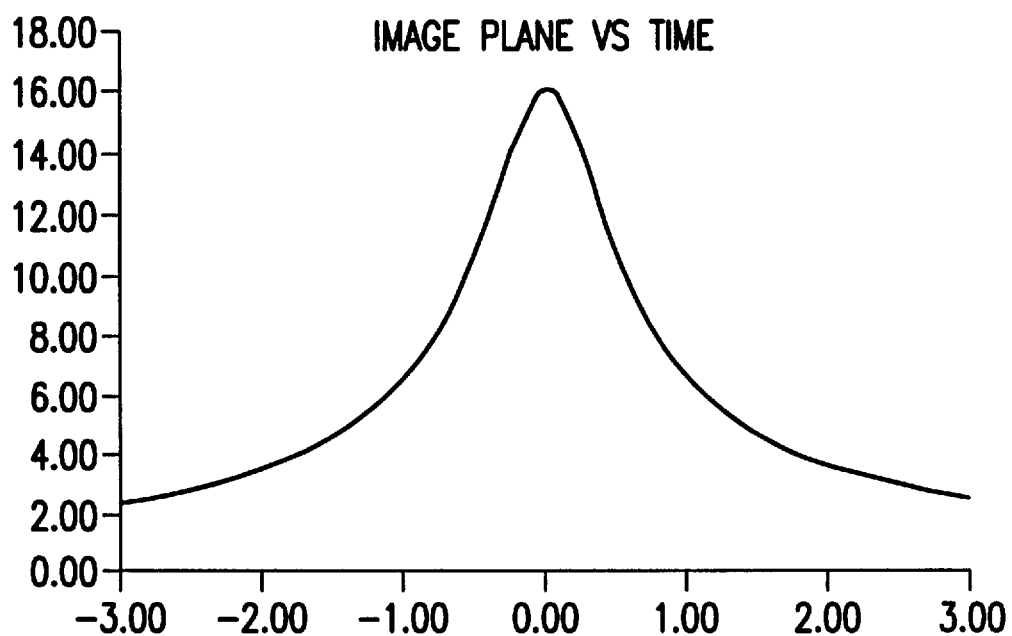
FIG. 1 shows a graph illustrating the behavior of the image plane position of an object moving with a uniform velocity.

As mentioned before, the change in position of the image plane is described by formula 1. This equation assumes that the object passes a point that is a certain distance away from the camera, but, considering restriction conditions in the actual shooting of a moving object, tracking or position prediction of the end sections of the curve illustrated in FIG. 1 becomes an important factor in taking a picture.

In other words, the moving object to be tracked has a certain size, such as cars or human beings, for example, and the shooting magnification must in general be no more than 1/30. Consequently, the lens used to track the moving object should primarily be a telephoto lens. If the closest distance is very far, the peak in the graph of the image plane position becomes low, the image plane velocity becomes low, and the change in the velocity becomes small. Therefore, the predicted error must become negligible.

For these reasons, it is sufficient to treat a section of the curve below the vertical midpoint of the peak with the closest distance O as a supplementary formula, which allows formula 1, showing the relationship between the image plane position and the object, to be replaced by a first order hyperbola.

$$y = \frac{a^2}{t_0 - t} + c \qquad (5)$$

Here $t_0$ represents the time at which the curve reaches its peak, t represents the time lapsed until that time, and a represents the slope of the function. Moreover, the position of the image plane observed depends on the current lens forwarding amount. Since the value of the forwarding amount is only a relative value when the position is monitored by an encoder, the position of the image plane is naturally a relative value as well. In the equation, c denotes the offset amount of the relative value from the as yet unknown absolute value.

Computing the image plane velocity and the image plane acceleration using formula 5, the velocity and the acceleration are obtained as follows.

$$\frac{dy}{dt} = \frac{a^2}{(t_0 - t)^2} \qquad (6)$$

$$\frac{d^2y}{dt^2} = \frac{2a^2}{(t_0 - t)^3} \qquad (7)$$

Formula 6 is the image plane velocity, and, using v to denote the velocity, formula 5 can be changed to:

$$y = a\sqrt{v} + c \tag{8}$$

Similarly, formula 7 is the image plane acceleration, using α to denote the acceleration.

$$\alpha = \frac{2}{a}(\sqrt{v})^3 \tag{9}$$

In order to focus on the target position after $t_1$ seconds from the current time, the lens should be driven with a velocity computed by the following formula with the assumption that the image plane movement at that time is a uniform velocity motion.

$$v_1 = v + \frac{\alpha}{2} \; t_1 = v + \frac{1}{\alpha}(\sqrt{v})^3 \tag{10}$$

Figure 7:
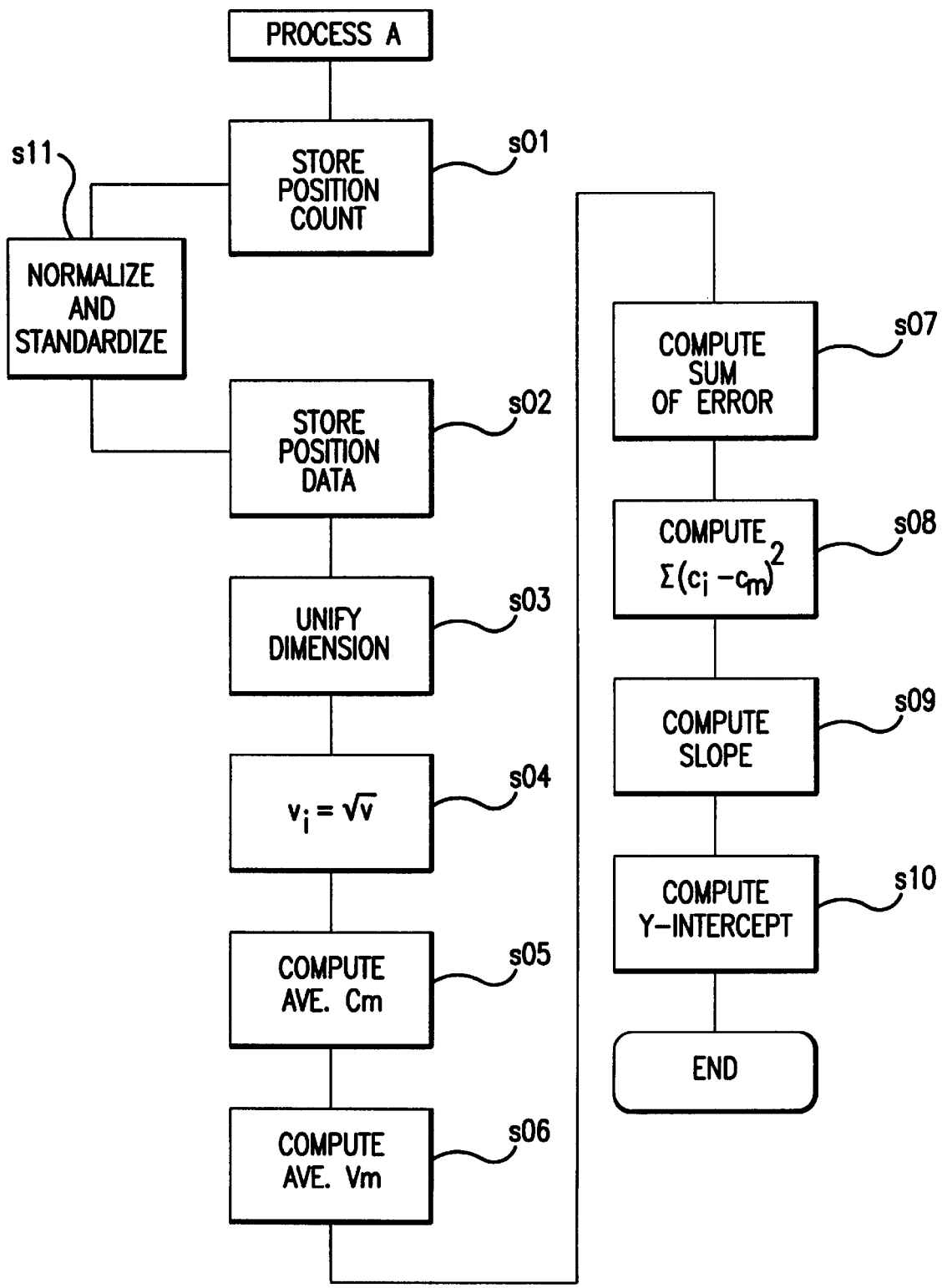
FIG. 7 shows a flow chart of the process steps of the first and second embodiments of the present invention.

Now that the computation method is explained, actual execution will be explained with reference to the flow chart illustrated in FIG. 7. In particular, process A covering a portion of the processing will be explained first, followed by an explanation of the flow chart for the entire process.

First, at step s01, encoder count values corresponding to the lens forwarding amount at the time of acquiring the defocus amount, which is already recorded, are retrieved into the operation memory 107. By this time, a specified number of defocus amounts and the image plane velocity, obtained by dividing the differences between the defocus amounts by the time, to be used in statistical processing are already computed and stored.

At step s11, these count values are transformed to normalized and standardized position data. The standardized data refer to the data used to compute the position of the image plane velocity at a standard time from the current count values, which represent the relative lens forwarding amount at the time of acquisition of the defocus amounts. More specifically, the image plane velocity is computed from two defocus amounts $def_n$ and $def_{n+1}$ m detected consecutively or several data apart, the lens forwarding amounts $cx_n$, and $cx_{n+1}$, at that time, and the actual time $t_n$, and $t_{n+1}$ of the defocus amount detection.

However, the dimensions of $cx_n$ and $cx_{n+1}$ representing the image plane positions (in formula 13) are converted from the lens forwarding amount to the defocus amount. Here, the conversion is accomplished by the following well-known method.

The defocus amount Bf is expressed by the lens forwarding amount P using the defocus transformation coefficient γ, the correction parameter L, and the gear ratio unique to each lens Kv. The following equation describes the relationship between the defocus amount Bf and the lens forwarding amount P.

$$Bf = \frac{\gamma P}{Kv\left(1 + \frac{\gamma P}{KvL}\right)} \tag{11}$$

Conversely, the lens forwarding amount P can be obtained in terms of the defocus amount Bf as follows.

$$P = \frac{kV \cdot Bf}{\gamma\left(1 - \frac{Bf}{L}\right)} \tag{12}$$

Using formula 11 and formula 12, transformation between the lens forwarding amount P and the defocus amount Bf can be accomplished immediately.

However, γ and L change with the lens position of each occasion; hence, it is necessary to use γ and L corresponding to the lens forwarding amount P at the respective lens positions in the above transformation method.

$$v_n = \frac{def_{n+1} - def_n + cx_{n+1} - cx_n}{t_{n+1} - t_n} \tag{13}$$

Figure 5:
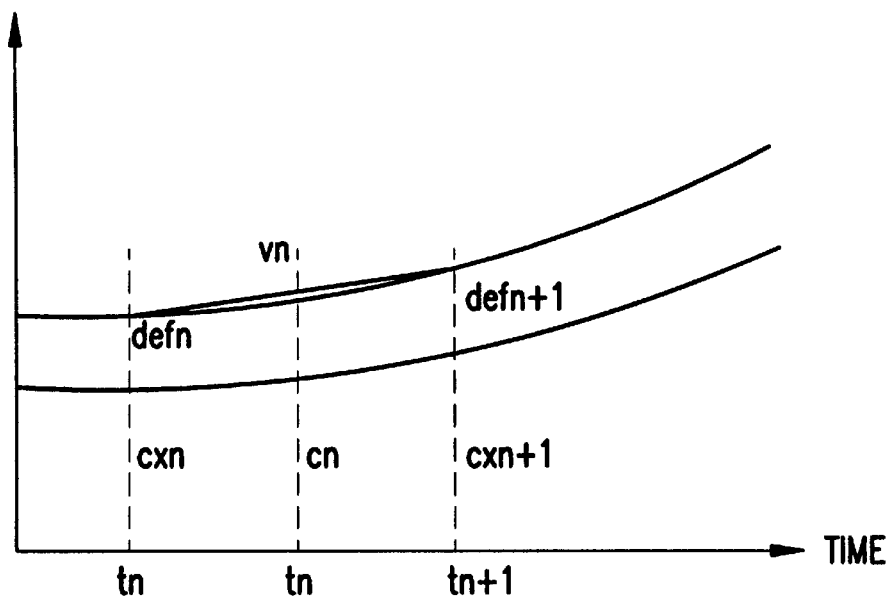
FIG. 5 shows a graph illustrating the standardized data in the first and second embodiments of the present invention.

The central point $t_n$, of the velocity thus obtained is neither $t_n$ nor $t_{n+1}$, but the midpoint between the two times in which a defocus amount is obtained (see FIG. 5). Because the lens forwarding amount to be correlated with the image plane velocity needs to be the amount at this time, the mid-point of $cx_n$ and $cx_{n+1}$ is selected as the standardized position datum $c_n$, which is stored again in the memory 107 at step s02.

At step s03, the standardized count value and the image plane velocity are converted to a unified dimension, such as the count value standard or the image plane movement amount standard, for the convenience of computation. Now that the prerequisites for computation are established in the steps above, the square roots of the image plane velocities of a specified number of data sets stored, 10, for example, are computed and stored in the memory means as $v_1, \ldots, v_n$, . . . , $v_{10}$ (s04).

Hereinafter, linear regression of $c_n$ and $v_n$ obtained above will be performed, which involves the computation of the slope and the y-intercept of formula 8 statistically.

The averages $c_m$ and $v_m$ of the standardized position data $c_n$ and the square root of the velocity $v_n$ are computed at steps s05 and s06, respectively. At step s07 the sum Scv of the products of the differences of each set of data $c_n$ and $v_n$ from the average $c_m$ and $v_m$, respectively, is computed.

$$S_{cv} = \Sigma(v_i - v_m)(c_i - v_m) \tag{14}$$

Similarly, the total sum of the square of the difference between the standardized position data and the average is computed at step s08.

$$S_{cc} = \Sigma(c_i - c_m)^2 \tag{15}$$

From these two sums, the slope a and the y-intercept c of formula 8 are computed. The slope is computed at step s09 from the following formula.

$$a = \frac{S_{cc}}{S_{cv}} \tag{16}$$

Moreover, the y-intercept is obtained at step s10 as follows.

$$c = cm - a^* vm \tag{17}$$

Figure 6:
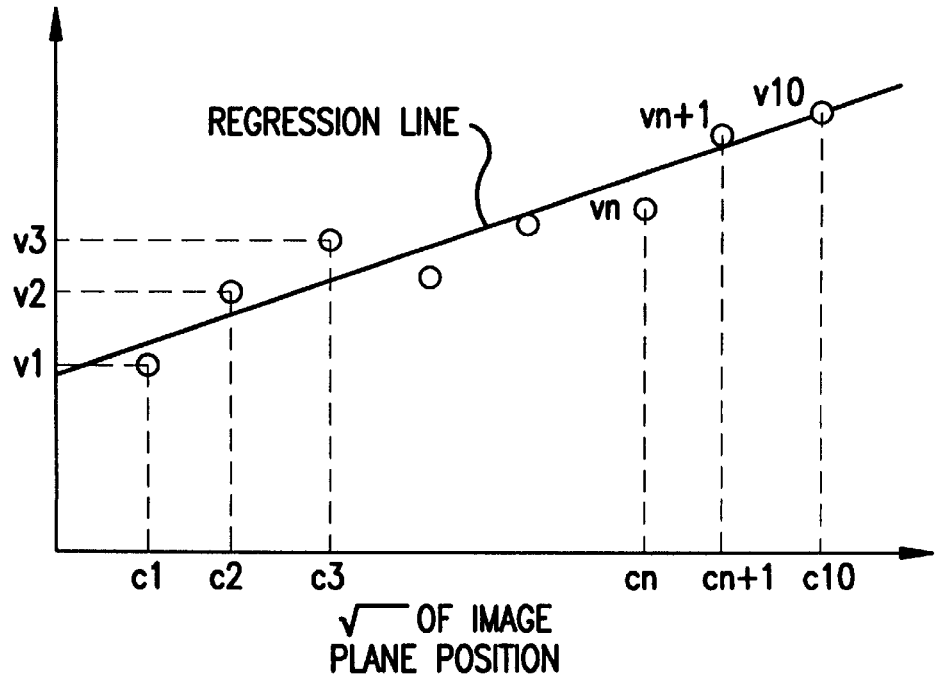
FIG. 6 shows a regression line graph according to the first and second embodiments of the present invention.

These two values thus obtained represent the slope and the y-intercept of the regression line described in FIG. 6. The steps described above show the computation method to establish prediction by regression. Next, a method used to determine the image plane position or the image plane velocity at the time of exposure using the process above will be explained.

Figure 8:
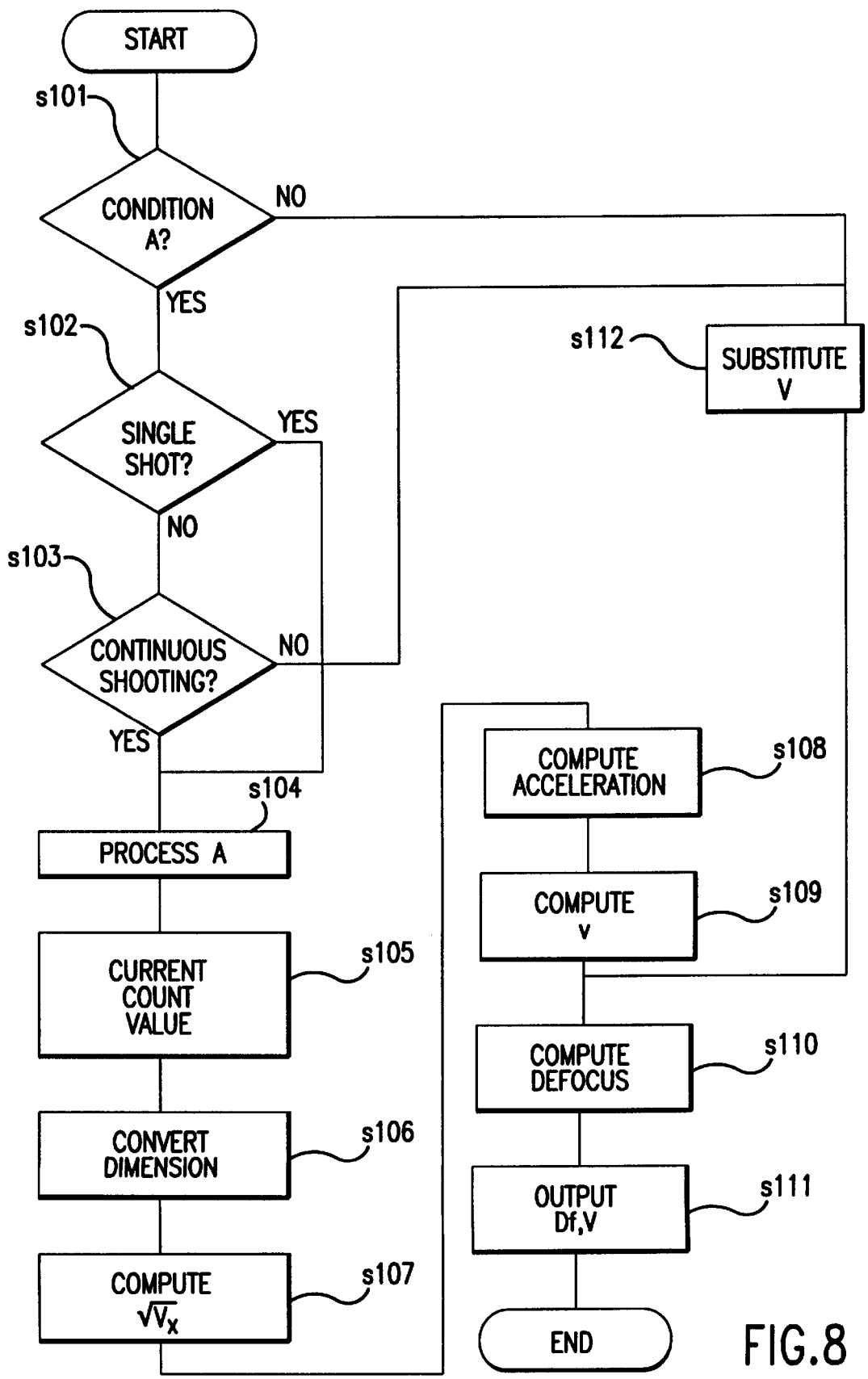
FIG. 8 shows a flow chart of the process used to drive a lens in the first and second embodiments of the present invention.

As described in FIG. 8, before obtaining the prediction data statistically, it must be decided first whether the data will be suitable as statistics. Condition A in step s101 is used to determine suitability. Here, the memory is checked to see if it contains a specified number of data or if the oldest data were obtained after a specified time and if continuity of the motion of the object can be expected. If these conditions are not met, the routine branches off to step s112, concluding that statistic processing will not be executed. If the suitability of the data is established at this step, a camera mode is further checked at steps s102 and s103 to see if it is set for single shooting or continuous shooting. After the first shot in continuous shooting, the number of focus detections per exposure is restricted. Hence, several times of exposure cannot be avoided before a specified number of data are obtained. Since exposure includes film feeding as well as raising and lowering of a mirror, it takes a considerably longer time compared to focus detection, requiring a fairly long time from the first data to the last data. Thus, continuity cannot be expected, and the CPU 106 moves to s112 without executing the statistics process after the first shot in the continuous shooting mode.

If the routine determines that execution of the statistics process is proper, process A mentioned above is executed at s104, and the slope and the y-intercept of the regression line are computed.

Once the factors of the regression line are determined, the current velocity and the acceleration are obtained by substituting the current lens forwarding amount into the formula (steps s105, s106, s107). Unlike focus detection, the data, not having a time lag such as computation time and accumulation time, can be entered at any time for the forwarding amount, so the current data are instantaneous data. The fact that the data thus obtained are the data of that very moment is remarkable, in light of the fact that the standard time of the latest image plane velocity time obtained from the discrete focus data is the midpoint between the current and the previous autofocus accumulation times. To explain the content of each step in more detail, the encoder data is read at s105 from a driving amount monitor, which is transformed to another dimension if necessary. If the unified dimension is the count value standard, transformation is not necessary. However, if it is the image plane velocity standard, transformation is necessary. Then, the square root of the time is obtained from the regression equation (s107). The current image plane velocity is computed by squaring this value.

Furthermore, the square root of the velocity is substituted in formula 9 at step 108 to obtain the current acceleration, and at step 109, the predicted image plane velocity for driving the lens is obtained from the acceleration and the image plane velocity obtained above.

Once the predicted image plane velocity for driving the lens is determined, the current defocus amount is computed similarly using the latest defocus amount def, the lens forwarding amount c during time t from the standard time when the latest defocus amount is obtained until the current time, and the image plane velocity v (at the central time). This can similarly be computed from the regression equation. If the statistic method is not used, the latest image plane velocity is used for v (s110).

$$def_n = def - c + vt \qquad (18)$$

Upon outputting this defocus amount and the driving velocity thus obtained to the driving control, the driving control compensates by the offset defocus amount and controls the driving of the lens so that the lens is driven with a specified velocity.

By this series of actions, the lens is able to move the image plane of the moving object onto the predicted image composition plane without fail. The value of c in formula 8 obtained through the above processes represents a relative encoder value based on the proper position, as the criteria and the offset amount of the absolute lens forwarding amount with infinite distance defined as 0 and the distance to the object as well as the velocity of the object can be computed from c. This information can also be utilized for systems other than an autofocus device.

Next, the process of computing absolute position will be explained in more detail. Initially, the standard position of the lens forwarding amount encoder output is assumed to be the current position, for example. This can be accomplished by defining the difference between the encoder output of each point and the current encoder output as the new encoder output of each point. By performing the above calculations on these data, the slope and the y-intercept of the regression equation are obtained. The y-intercept represents an absolute lens forwarding amount with infinity defined as O. This can easily be changed to the image plane position from infinity by dimension conversion. Moreover, the image plane position from infinity can easily be changed to the absolute distance from the camera. Similarly, the image plane velocity itself can be evaluated as the actual velocity of the object.

The above described processes are performed by the main CPU 106 using a memory. Once the current defocus amount and the target velocity are determined by these series of computations, they are transformed into the dimension of the lens forwarding amount and transmitted to lens CPU 108 via lens connect point 109 to make the lens CPU 108 execute focus driving control accordingly. The focus lens is driven by the motor 103 with a specified target velocity, while the defocus amount is compensated by the offset amount. Because the focus lens is controlled with a velocity close to the image plane velocity of the object, error in the target time is not likely to be reflected in the focus position.

In particular, the focus position of the focus lens and the image plane position of the object cross each other with a shallow angle, and exposure takes place at this instance.

Figure 4:
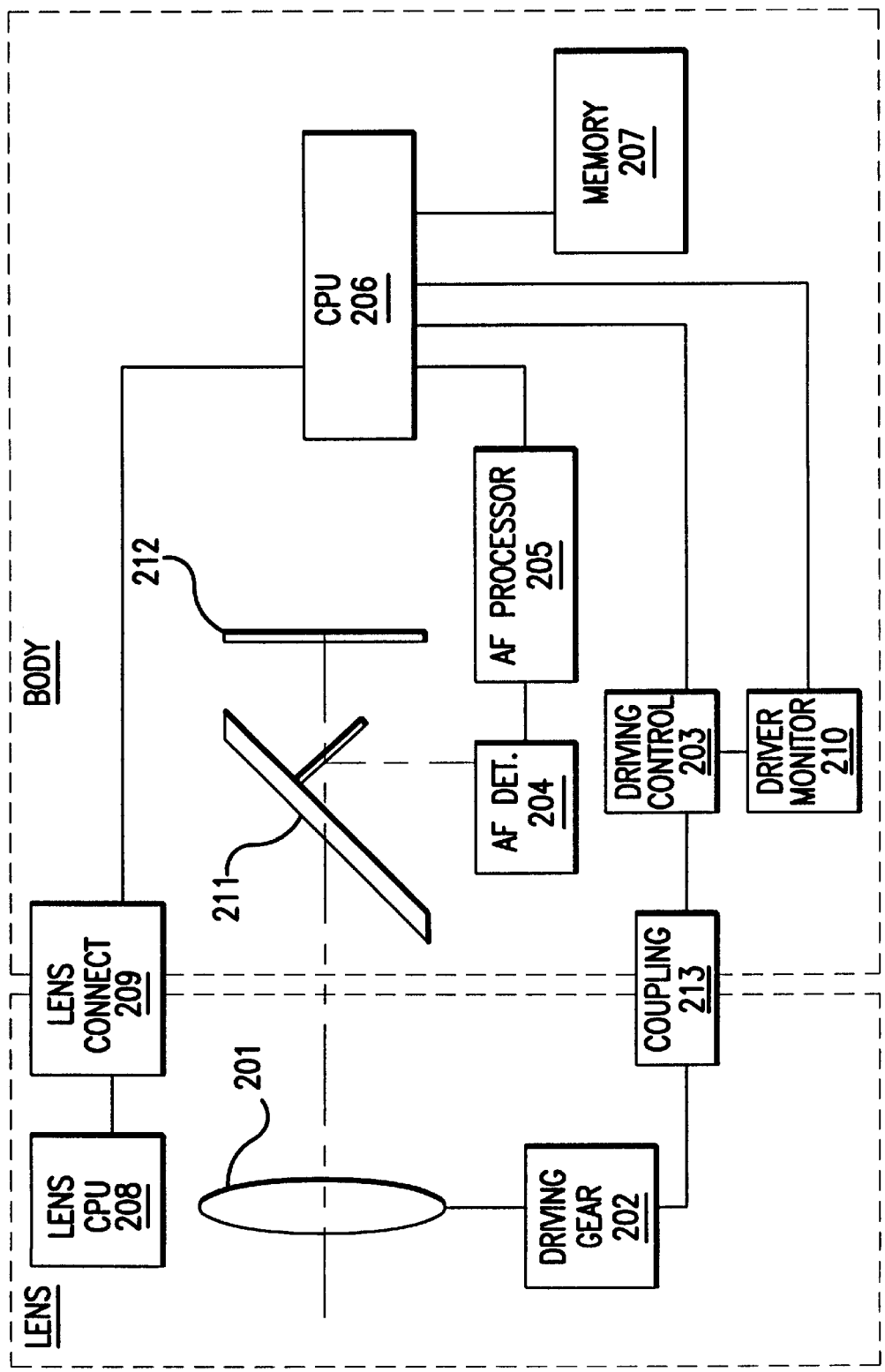
FIG. 4 shows a schematic drawing illustrating the structure of the second embodiment of the present invention.

FIG. 4 illustrates the second embodiment. Unlike the first embodiment which has the driving control (motor) in the main body of the lens, the second embodiment has the driving control (motor) in the camera body side so that the drive is transmitted to the focus lens 201 through a coupling 213. Similarly, a driving amount monitor 210 is also mounted in the camera body side to monitor the movement of the motor in real time.

In the second embodiment, it is possible to control the velocity of the focus lens as in the case of the first embodiment. The focus motion is executed by a method similar to the first embodiment, but, in addition to this focus motion, intermittent focus motion is also possible, caused by the image plane position drive. Hereafter, this position drive will be explained.

$$y = vt_1 + Df \qquad (19)$$

$v_{t1}$ in formula 19 is v (image plane velocity) after t1 seconds and is outputted together with Df at sill in the flow chart illustrated in FIG. 8. The target image plane position y is obtained from formula 19 by extending the image plane velocity computed in the flow chart of FIG. 8, and the focus lens is driven toward the target position using the motor. This drive is different from velocity control. Therefore, the focus lens arrives at the target image plane position before the exposure time and waits at the position for the object image to arrive until the exposure time.

The invention has been described with reference to the preferred embodiments thereof, which are illustrative and not limiting. Various changes may be made without departing from the spirit and scope of the invention as defined in the appended claims.

What is claimed is:

1. An autofocus device for a camera, comprising:

a defocus amount detector;

a memory to store a plurality of consecutive immediate past data sets including detection amount data obtained from the defocus amount detector and data corresponding to a lens forwarding amount; and an autofocus processor section to process the data stored in the memory to predict a future predicted image composition plane at a specific time based on a specific function that includes a term that is the square root of the image plane velocity statistically manipulated from past data sets, and current movement of the image composition plane, wherein a change in a position of the image composition plane is defined by the specific function derived from regression analysis of image plane movement described by the consecutive immediate past data sets so that driving of a focus lens can be controlled based on the future predicted image composition plane and the current movement of the image composition plane.

2. The autofocus device according to claim 1, wherein exposure is performed continuously for a moving object in such a manner that the image composition plane during a next exposure is predicted by the autofocus processor section and the focus lens is driven to allow the object image to coincide with the predicted image composition plane during exposure.

3. The autofocus device according to claim 1, wherein the autofocus processor section predicts the future image composition plane using a reciprocal function as the specific function.

4. The autofocus device according to claim 1, wherein the autofocus processor section predicts the future image composition plane using a first order hyperbola as the specific function.

5. The autofocus device according to claim 1, wherein the autofocus processor section predicts the future image composition plane using the following function as the specific function when an image plane position is below a vertical midline of a curve defining the image composition plane:

$$y = \frac{a^2}{t_0 - t} + c$$

where y is a y-intercept position, a is a slope of the function, $t_0$ is a time at which a peak of the specific function defining the image composition plane occurs, t is the time lapsed until that time, and c is an offset constant.

6. The autofocus device according to claim 1, wherein the autofocus processor section predicts the image composition plane using the following function as the specific function:

$$y = a\sqrt{v} + c$$

where y is a y-intercept position, a is a slope of the function, v is the current image plane velocity, and c is an offset constant.

7. The autofocus device of claim 1, wherein the autofocus processor section computes a specific function for a plurality of image plane velocities obtained from the plurality of past data sets and a linear regression equation for the data corresponding to the plurality of lens forwarding amounts, the position of the image plane at a specific time being predicted by the autofocus processor section based on a correlation between the specific function and the linear regression, driving of a focus lens being executed based on the correlation.

8. The autofocus device of claim 1, wherein the autofocus processor section predicts the image composition plane based on the detection amount data, change in the position of the image plane is considered to be the specific function, a regression line is obtained by the autofocus processor section using the data stored in the memory to fit the specific function to movement of the image plane described by the plurality of past data sets based on the regression line, and movement of the image plane is predicted using the specific function.

9. The autofocus device according to claim 8, wherein the specific function includes a term that is the square root of the image plane velocity.

10. An autofocus device according to claim 8, wherein the autofocus processor section computes a correlation between a plurality of image plane velocities or their corresponding function transformation values and the data corresponding to a plurality of lens forwarding amounts, and, based on the correlation, the autofocus processor section computes absolute values of the plurality of lens forwarding amounts.

11. The autofocus device according to claim 10, wherein the specific function includes a term that is the square root of the image plane velocity.

12. An autofocus device for a camera, comprising:

a defocus amount detector;

a memory to store a plurality of consecutive immediate past data sets including detection amount data obtained from the defocus amount detector and data corresponding to a lens forwarding amount; and an autofocus processor section to process the data stored in the memory to predict a future image composition plane based on the detection amount data, wherein the autofocus processor section obtains a regression line from the stored consecutive immediate data sets using a function having a term that is the square root of the image plane velocity and, based on a forwarding amount at a certain time, including the current time, one or more of an image plane velocity at that time, an absolute image plane position, and an image plane acceleration is computed.

13. The autofocus device according to claim 12, wherein the autofocus processor section predicts a future image plane position and an image plane velocity after a specified time based on a previously obtained image plane velocity, image plane position and image plane acceleration.

14. A method of accurately predicting tracking of a moving object in an autofocus device of a camera having a focusing lens, a defocus amount detector, a memory to store a plurality of past data sets including detection amount data obtained from the defocus amount detector and data corresponding to a lens forwarding amount, a driving control, and an autofocus processor section to process the data stored in the memory, the method comprising the steps of:

(a) obtaining a predetermined plurality of defocus amounts from the defocus detector taken at predetermined intervals of time and storing the predetermined plurality of defocus amounts in the memory;

(b) obtaining relative lens forwarding amount data, one for each of the predetermined intervals of time;

(c) normalizing and standardizing the lens forwarding amounts data as position data $c_n$;

(d) computing an image plane velocity from at least two previous defocus amounts, two corresponding lens forwarding amounts taken at the same time as the defocus amounts, and the actual time at each defocus amount detection;

(e) converting the lens position data $c_n$ and the computed image plane velocity to a unified dimension;

(f) storing a square root of the image plane velocity ($v_n$) of a specified number of data sets in the memory;

(g) performing linear regression on the position data $c_n$ and the square roots of the image plane velocity $v_n$ to statistically determine a slope and a y-intercept of a function defining the image plane velocity;

(h) obtaining current image plane velocity by substituting a current lens forwarding amount into the function defining the image plane velocity determined in step (g);

(i) determining the current image plane acceleration from the current image plane velocity obtained in step (h);

(j) obtaining a predicted image plane velocity from the current image plane velocity and the current image plane acceleration determined in steps (h) and (i);

(k) obtaining a current defocus amount from the latest defocus amount, the lens forwarding amount from the time when the latest defocus amount was obtained until the current time, and the image plane velocity;

(l) outputting the current defocus amount and the predicted image plane velocity to the driving control; and (m) controlling the velocity of the focus lens using the driving control based on the outputted current defocus amount and the predicted image plane velocity.

15. The method of claim 14, wherein the step of linear regression to statistically determine the slope and the y-intercept includes:

computing averages $c_m$, $v_m$ for the standardized position data $c_n$ and the square root of the image plane velocity $v_n$;

summing the product of the differences of each data $c_n$, $v_n$ from the computed averages $c_m$, $v_m$;

computing the total sum of the square of the differences between the standardized position data $c_n$ and the average $c_m$; and determining the slope and y-intercept of a specific function from the previous summing steps.

16. The method of claim 14, further comprising a step of checking the data sets to determine suitability of the data within the data sets.

17. The method of claim 16, wherein the step of checking is performed by determining whether the memory contains a specified number of data sets.

18. The method of claim 16, wherein the step of checking is performed by determining whether an oldest of the data sets in the memory was obtained after a specified time.

19. An autofocus device for a camera, comprising:

a defocus amount detector means for detecting a defocus amount;

a memory means for storing a plurality of consecutive immediate past data sets including detection amount data obtained from the defocus amount detector means and data corresponding to a lens forwarding amount; and an autofocus processor means for processing the consecutive immediate data sets stored in the memory to predict a future predicted image composition plane at a specific time based on a specific function that includes a term that is the square root of the image plane velocity statistically manipulated from past data sets, and current movement of the image composition plane, wherein a change in a position of the image composition plane is defined by the specific function derived from regression analysis of image plane movement described by the consecutive immediate past data sets so that driving of a focus lens can be controlled based on the future predicted image composition plane and the current movement of the image composition plane.

20. The autofocus device according to claim 19, wherein the autofocus processor means computes a specific function for a plurality of image plane velocities obtained from the data sets and a linear regression equation for the data corresponding to the plurality of lens forwarding amounts, the position of the image plane at a specific time being predicted by the autofocus processor means based on a correlation between the specific function and the linear regression, driving of a focus lens being executed based on the correlation.

21. The autofocus device of claim 19, wherein the autofocus processor means computes a specific function for a plurality of image plane velocities obtained from the data and a linear regression equation for the data corresponding to the plurality of lens forwarding amounts, the position of the image plane at a specific time being predicted by the autofocus processor means based on a correlation between the specific function and the linear regression, driving of a focus lens being executed based on the correlation.

22. The autofocus device of claim 19, wherein the autofocus processor means predicts the image composition plane based on the defocus amount detector means detected data, change in the position of the image plane is considered to be a specific function, a regression line is obtained by the autofocus processor means using the data stored in the memory means to fit the specific function to movement of the image plane described by the data based on the regression line, and movement of the image plane is predicted using the specified function.

23. An autofocus device for a camera, comprising:

a defocus amount detector;

a memory to store a plurality of past data sets including detection amount data obtained from the defocus amount detector and data corresponding to a lens forwarding amount; and an autofocus processor section to process the data stored in the memory to predict a future predicted image composition plane at a specific time based on a specific function, statistically manipulated from past data sets, and current movement of the image composition plane, wherein a change in a position of the image composition plane is defined by the specific function derived from regression analysis of image plane movement described by the past data sets so that driving of a focus lens can be controlled based on the future predicted image composition plane and the current movement of the image composition plane, wherein the autofocus processor section predicts the image composition plane using the following function as the specific function when an image plane position is below a vertical midline of a curve defining the image composition plane:

$$y = \frac{a^2}{t_0 - t} + C$$

where y is a y-intercept position, a is a slope of the function to is a time at which a peak of the specific function defining the image composition plane occurs, t is the time lapsed until that time, and C is an offset constant.

* * * * *